C. E. EGNÉR & J. G. HOLMSTRÖM.
CARBON GRAIN CELLS OF TELEPHONE TRANSMITTERS.
APPLICATION FILED NOV. 2, 1910.

1,042,772.

Patented Oct. 29, 1912.

UNITED STATES PATENT OFFICE.

CARL EMIL EGNÉR, OF STOCKHOLM, AND JOHAN GUNNAR HOLMSTRÖM, OF SALTSJÖ-STORÄNGEN, SWEDEN.

CARBON-GRAIN CELLS OF TELEPHONE-TRANSMITTERS.

1,042,772.

Specification of Letters Patent.

Patented Oct. 29, 1912.

Application filed November 2, 1910. Serial No. 590,335.

*To all whom it may concern:*

Be it known that we, CARL EMIL EGNÉR, a subject of the King of Sweden, and resident of Blekingegatan 63, Stockholm, in the Kingdom of Sweden, and JOHAN GUNNAR HOLMSTRÖM, a subject of the King of Sweden, and resident of Saltsjö-Storängen, in the Kingdom of Sweden, have invented certain new and useful Improvements in Carbon-Grain Cells of Telephone-Transmitters, of which the following is a specification, reference being had therein to the accompanying drawing.

This invention relates to telephone transmitters of that class, which are provided with a plurality of stationary electrodes, each forming the bottom of a transmitter cell, and with a diaphragm common to all cells, and the object of the invention is to so arrange the said transmitters that the rings or walls containing the cells can adjust themselves automatically into the right position with relation to the stationary electrodes respectively without causing any disturbing strain of the parts of the transmitter. This object is gained by using a disk supported in a yielding manner and provided with openings through which the stationary electrodes project, the said disk forming a support to the said rings or walls in such a manner as to allow them to slide on the disk.

Figure 1:
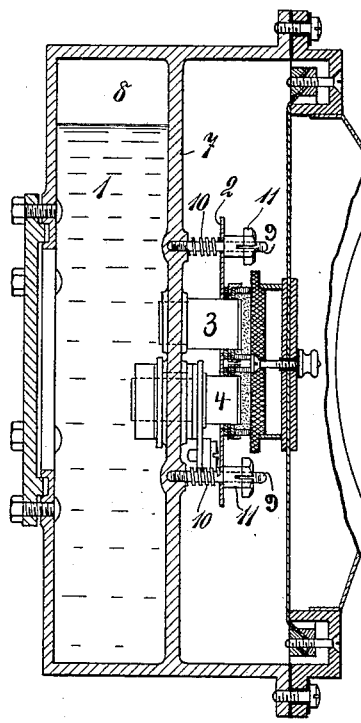
Figure 2:
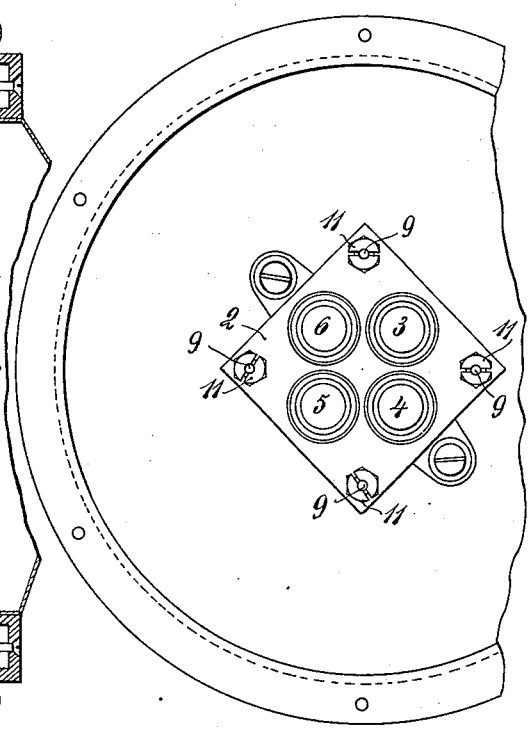
Figure 3:
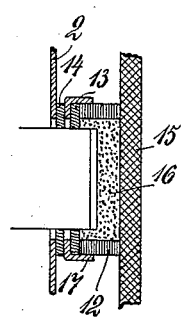

In the accompanying drawing, Figure 1 is a vertical section of a transmitter provided with a plurality of carbon-grain cells arranged in accordance with this invention, Fig. 2 is a front view of the transmitter, and Fig. 3 is a section of one of the cells on a greater scale.

The transmitter shown in the drawing is adapted especially for strong currents when a comparatively strong heating of the cells is to be feared.

A is the diaphragm carrying an electrode 15. The stationary electrodes 3, 4, 5, and 6, are fixed to a wall 7 of a casing 8 containing a cooling liquid 1. Openings are provided in a light disk 2 of mica, aluminium or the like common to all the electrodes, through which openings the electrodes project. The said openings are so great, that no carbon-grains having passed out from the cell, can be jammed between the electrode and the disk. The disk 2 is held in proper position and at a suitable distance from the plane, in which the front faces of the stationary electrodes are located, by guide pins 9, fixed in the wall 7, spiral spring 10, wound around the said pins, and bearing against the rear side of the disk, and nuts 11 in screw threaded engagement with the pins and bearing against the front side of the disk.

The cell proper is inclosed by a ring 12 of asbestos or any other suitable material, which can endure a high temperature without being damaged. The inner diameter of the ring is very much greater than the outer diameter of the electrode. The said ring 12 bears against a thin ring 13 of felt, located in and bearing against the bottom of a thin bowl 17 of aluminium, which in its turn bears against the disk 2, a further ring 14 of felt being preferably mounted between the said bowl and the disk. The main object of the rings 13 and 14 is to form tightening means around the electrode and prevent carbon-grains from falling out and for that purpose they fit snugly to the same. The front end of the asbestos ring 12 bears against the diaphragm or, as shown in the drawing, against the electrode 15 fixed to the same in a suitable manner and oscillating with the same. Such an electrode can be provided at each cell.

The pressure of the asbestos rings 12 against the oscillating electrode 15 is adapted by suitably adapting the tension of the spiral springs 10. The said pressure may not be too great as it will then damp the oscillations of the diaphragm a too great extent, but it may, however, be not too slight, as the own oscillations of the diaphragm then become too effective.

Owing to the fact that the soft felt rings 13 and 14 are located between the hard asbestos ring 12 and the disk 2 the damping of the oscillations of the diaphragm does not become too great even if the pressure against the electrode 15 should be comparatively great.

A thin ring of asbestos may, if wanted, be substituted for the felt ring 13, and, possibly, for the ring 14. The effect of the transmitter is, however, reduced by the said arrangement, owing to the fact that the carbon-grains would have the tendency to be jammed between the said asbestos ring and the electrode, the pressure between the ring 12 and the electrode 15 being, besides, not so elastic as in the arrangement shown in the drawing.

The diameter of the openings provided in the bottom of the aluminium bowls 17 and the disk 2 is very much greater than the diameter of the electrodes. Consequently, if carbon-grains should enter the space, between the felt rings 13 and 14 and the electrode, it is not to be feared that they are jammed. The said grains may, even, work themselves out of the cell gradually the said way without any considerable disadvantages being thereby created.

A felt ring may be substituted for the asbestos ring 12, but the transmitter is then not able to bear a strong current, as the said felt ring is easily burned, especially at the electrode 15.

By means of the disk 2 and the spiral springs 10, acting upon the same, all the asbestos rings 12 are forced forward against the electrode 15 at a pressure as uniform as possible and without being able to occupy an oblique position. As the four asbestos rings and the parts coöperating with the same are entirely independent one of the other, they can slide on the disk 2 and be centralized with regard to the electrodes respectively, owing to which fact no accidental variations of the resistance and consequently the tension in the cells can be effected, by lateral forces.

The arrangement of the cell described above is suitable especially for transmitters provided with two or more cells for causing the cells to act simultaneously and in unison.

What we claim is:

1. In a telephone transmitter the combination of a plurality of stationary electrodes, each forming the bottom of the transmitter cells respectively, a diaphragm common to the cells, a disk supported in a yielding manner and provided with openings through which the electrodes extend, and inclosing walls for the cells, bearing against the said disk in a slidable manner, substantially as described and for the purpose set forth.

2. In a telephone transmitter the combination of a plurality of stationary electrodes, each forming the bottom of the transmitter cells respectively, a diaphragm common to the cells and carrying a number of electrodes, closing the cells, a disk supported by adjustable yielding means and provided with openings, through which the electrodes extend, and inclosing walls for the cells, bearing against the said disk in a slidable manner, substantially as described and for the purpose set forth.

In witness whereof, we have hereunto signed our names in the presence of two subscribing witnesses.

CARL EMIL EGNÉR.
JOHAN GUNNAR HOLMSTRÖM.

Witnesses:
   HEDING MELINDER,
   ROBERT APELGREN.

---

Copies of this patent may be obtained for five cents each, by addressing the "Commissioner of Patents, Washington, D. C."